United States Patent [19]
Rieker et al.

[11] Patent Number: 5,945,196
[45] Date of Patent: Aug. 31, 1999

[54] METHOD OF MANUFACTURING SCREEN AND FILMS PRODUCED THEREWITH

[75] Inventors: Gregory M. Rieker, Clinton; Edward R. Cook, Terre Haute, both of Ind.

[73] Assignee: Tredegar Industries, Inc., Richmond, Va.

[21] Appl. No.: 08/791,705

[22] Filed: Jan. 30, 1997

Related U.S. Application Data

[63] Continuation of application No. 08/306,484, Sep. 15, 1994, abandoned.

[51] Int. Cl.$^6$ .................................................... B32B 3/10
[52] U.S. Cl. .................. 428/131; 428/304.4; 428/314.2; 428/314.4; 428/314.8; 425/290; 425/291; 425/295; 425/387.1; 425/388; 425/403; 425/471; 425/296; 425/298; 264/154; 264/155; 264/156
[58] Field of Search .................................... 264/154–156; 428/304.4, 314.2, 314.4, 314.8, 131; 425/290, 291, 295, 387.1, 388, 403, 471, 296, 298

[56] References Cited

U.S. PATENT DOCUMENTS

| | | | |
|---|---|---|---|
| 3,054,148 | 9/1962 | Zimmerli | 264/504 |
| 3,709,647 | 1/1973 | Barnhart | 425/224 |
| 4,151,240 | 4/1979 | Lucas | 264/504 |
| 4,155,693 | 5/1979 | Raley | 425/363 |
| 4,252,516 | 2/1981 | Roley | 425/290 |
| 4,319,868 | 3/1982 | Riemersma et al. | 425/290 |
| 4,323,069 | 4/1982 | Ahr et al. | 604/378 |
| 4,327,730 | 5/1982 | Sorensen | 604/370 |
| 4,364,723 | 12/1982 | Louis et al. | 425/384 |
| 4,388,056 | 6/1983 | Lee et al. | 425/83.1 |
| 4,509,908 | 4/1985 | Mullane, Jr. | 425/290 |
| 5,252,279 | 10/1993 | Gore et al. | 264/154 |
| 5,328,587 | 7/1994 | Fenske | 205/73 |

OTHER PUBLICATIONS

"Controlled Aperture Seamless Tubular Screens", drawing of hex screen, IR Engraving, Inc., May 17, 1994, 1 page.

*Primary Examiner*—Leszek Kiliman
*Attorney, Agent, or Firm*—Jenkens & Gilchrist, P.C.

[57] ABSTRACT

A method for the manufacture of a screen useful for forming three-dimensional films, the screens and the three-dimensional films produced using those screens are disclosed. In forming a screen, a substrate material is applied to a base. A predetermined amount of portions of the substrate are removed to form a predetermined pattern in the substrate. A screen material is applied to the patterned substrate material. A predetermined amount of portions of the screen material are removed to form a predetermined pattern in the screen material. The predetermined pattern in the screen defines a plurality of first perforations in the screen material. The substrate material is removed from the screen material, such that second perforations are formed in the screen, whereby each first perforation is in communication with an adjacent second perforation.

46 Claims, 4 Drawing Sheets

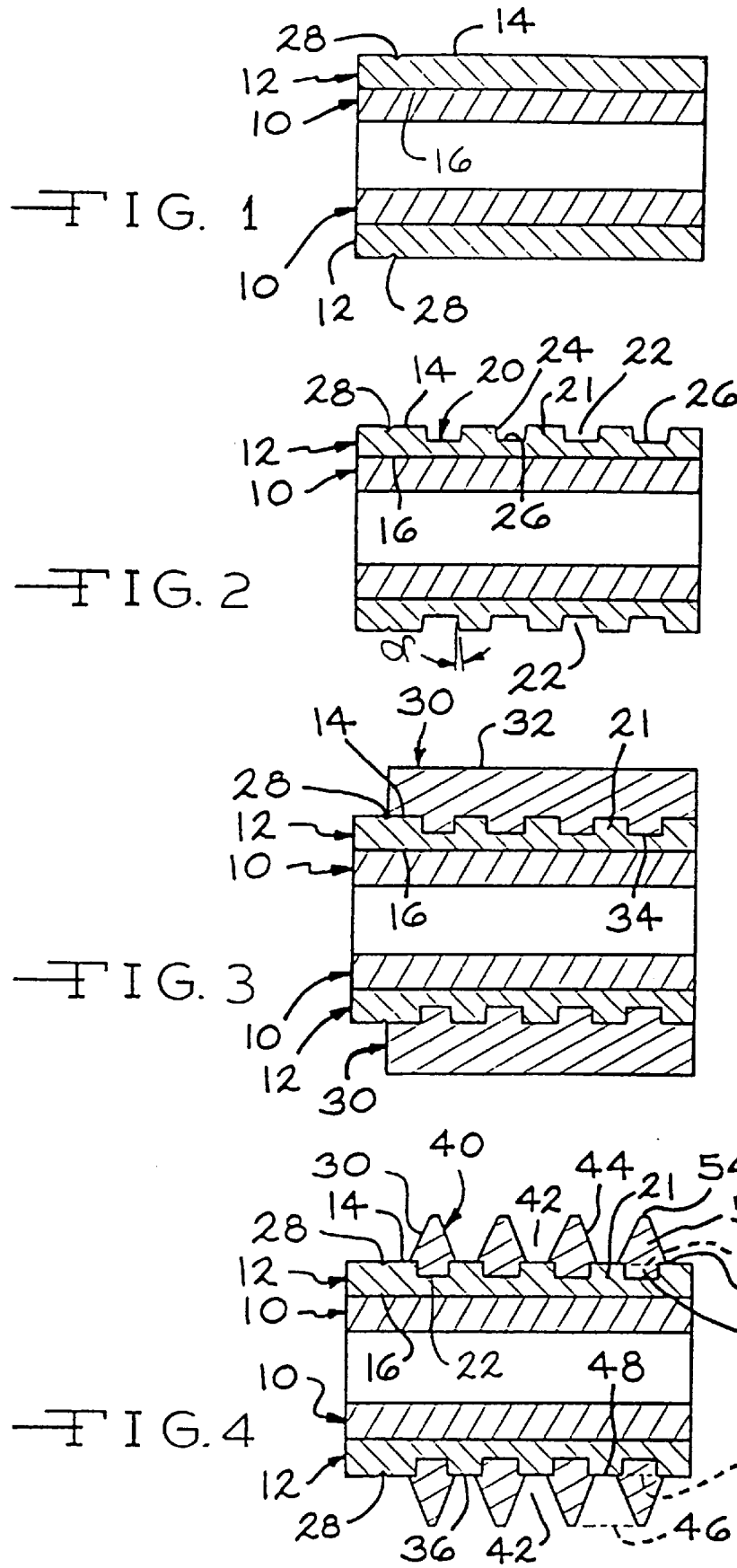

~156~

~176~

METHOD OF MANUFACTURING SCREEN AND FILMS PRODUCED THEREWITH

This is a continuation of application Ser. No. 08/306,484 filed on Sep. 15, 1994 now abandoned.

TECHNICAL FIELD

The present invention relates to a screen apparatus for producing apertured and non-apertured three-dimensional thermoplastic sheets or films, a method for making such apparatus and the thermoplastic sheet and film products which are produced thereby.

BACKGROUND OF THE INVENTION

It is known that apertured and/or embossed or non-apertured thermoplastic sheets or films have many useful applications. In disposable absorbent products, the apertured film permits the flow of liquid in the direction toward the absorbent materials in the disposable product, but reduces the possibility of fluid flow in the opposite direction. Embossed films with and without apertures are used in making products that have a cloth-like texture or appearance.

Methods for making such thermoplastic films include having a stationary drum with a perforated screen or molding element mounted on the outer surface of the drum. The screen is adapted to rotate freely on the surface of the drum. A vacuum chamber is employed beneath the screen or to create a pressure differential. As a film of thermoplastic material is passed over the screen, the pressure differential between the top surface of the film and the bottom surface of the film causes portions of the film to be pulled or flow into the perforations in the screen. A plurality of protuberances and/or apertures are formed in the film which correspond to the perforation pattern of the screen. One such method is described in Zimmerli, U.S. Pat. No. 3,054,148 reference.

A variety of methods and apparatuses, including particular types of perforating screens or rotatable molding elements have been developed over the years for particular perforation operations. Examples of these include U.S. Pat. Nos. 4,155,693, 4,252,516, 3,709,647, 4,151,240, 4,319,868 and 4,388,056. In U.S. Pat. No. 4,155,693, the screen comprises a series of perforated metal strips, preferably welded together to form a cylinder. U.S. Pat. No. 4,252,516 provides a screen having a series of hexagonal depressions with elliptical holes centered therein. U.S. Pat. No. 3,709,647 provides for a rotating vacuum-forming roll having a circulating cooling medium therein.

U.S. Pat. No. 4,151,240 provides a means for cooling the film after it has been perforated and debossed. U.S. Pat. No. 4,319,868 describes an apparatus for making a thermoplastic film having raised bosses with perforated tips. U.S. Pat. No. 4,388,056 discloses an air-laying drum having a honeycomb-type annular-shape frame including circumferentially extending ribs and transverse plates.

In certain instances, it is desired to produce films with protuberances (apertured or non-apertured) which can extend from the film at a substantially right angle to the surface of the film. Films with such right angle perforations provide a direct line of sight and a direct fluid path through the film. In certain other instances, the right angled protuberances are undesirable since the collected fluid remains visible through the perforations and a topsheet of the product. Accordingly, there is a need for film having characteristics which reduce the visible presence of the collected fluids.

The screen apparatus of the present invention is useful to produce three-dimensional films, wherein the desired protuberance geometry can extend through the film at an angle other than a substantially right angle to the surface of the film. The films can be utilized for protective clothing where fluids contact the surface of the film, such that the fluids do not have a direct path through the film. This non-flow through characteristic greatly improves the protective quality of the film or clothing.

Therefore, it is an object of the present invention to provide a screen apparatus for producing a three-dimensional film having a plurality of protuberances (apertured or non-apertured) of any desired configuration. Another object of the present invention is to provide a method for making such apparatus.

Another object of the present invention is to provide a thermoplastic three-dimensional film having protuberances or apertures which extend from the surface of the film at a right angle or an angle other than a right angle.

Other objects and advantages of the present invention will become more apparent from the reading of the description and drawings hereinafter.

DISCLOSURE OF THE INVENTION

An apparatus is provided for the manufacture of selectively apertured or non-apertured thermoplastic films or sheets which comprises a rotatable molding element or screen which receives a thermoplastic film. The screen has a plurality of perforations which impart a desired pattern of three-dimensional protuberances (open and/or closed) on the film upon contact therewith and upon application of a fluid pressure differential or vacuum across the surface of the film.

A method is also provided for making a screen useful for making a three-dimensional film having protuberances in which the protuberances on the film extend from a surface of the film either at a right angle or at other than right angles. According to one method for making such screen, a base or mandrel is coated with a desired substrate material. In preferred embodiments, the substrate coated mandrel is produced with an outer surface having a predetermined desired outside diameter. A precise predetermined amount of substrate material is removed (preferably by cutting either via engraving or electrical discharge machining (EDM) process) such that a precise first pattern is formed on the outside surface on the substrate coated mandrel. The pattern defines a plurality of openings or undercut portions, each having a desired geometry.

A screen material is applied to the patterned substrate coated mandrel. A precise predetermined amount of screen material is removed (preferably by engraving or EDM) such that a predetermined second pattern is formed on the surface of the screen. The second pattern defines a plurality of perforations each having a desired geometry. The portions of screen material are removed to a sufficient depth such that perforations are created in the screen material; that is, the second pattern extends into predetermined portions of the substrate.

After the second pattern is formed on the outer diameter of the screen, the screen is removed from the mandrel. In certain embodiments, the screen is removed from the mandrel by dissolving the substrate with a suitable solvent material.

The present method provides a seamless cylindrical screen having a screen pattern which is especially useful in vacuum forming thermoplastic apertured and non-apertured films. The screen defines the aesthetic and mechanical properties of the film, as well the geometric pattern of the protuberances on the film. In preferred embodiments, it is desired to have a precise registration between the first pattern in the substrate and the second pattern in the screen material. The precise registration between the first pattern and the second pattern produces a film having the desired protuberance geometry.

The screens can be used to make three-dimensional films, wherein the thermoplastic material is molten when applied to the screen. Alternatively, a thermoplastic film can be reheated to a suitable temperature such that protuberances can be formed in the film.

BRIEF DESCRIPTION OF THE DRAWINGS

FIG. 1 is a greatly enlarged schematic cross-sectional view showing a first step in one method of making a screen.

FIG. 2 is a greatly enlarged schematic cross-sectional view showing a second step in one method of making a screen.

FIG. 3 is a greatly enlarged schematic cross-sectional view showing a third step in one method of making a screen.

FIG. 4 is a greatly enlarged schematic cross-sectional view showing a fourth step in one method of making a screen.

DETAILED DESCRIPTION OF THE PRESENT INVENTION

Figure 5:
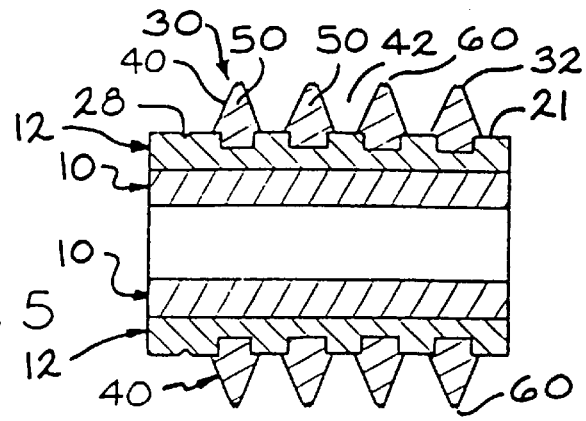
FIG. 5 is a greatly enlarged schematic cross-sectional view showing a fifth step in one method of making a screen.

FIGS. 1–6 are schematic cross-sectional illustrations which present sequential steps for making a screen according to one method of the present invention. A base or mandrel 10 having a predetermined specified outside diameter is substantially coated with a substrate material 12. The substrate 12 can be applied by various means, including spray application, plating and the like. In preferred embodiments, the mandrel 10 has a cylindrical shape and comprises a steel material, while the substrate 12 comprises a spray-applied aluminum material. The substrate 12 has a top surface 14 and a bottom surface 16. The substrate 12 is applied such that the top surface 14 has a desired precise predetermined outside diameter.

Referring now to FIG. 2, a precise predetermined amount of the substrate 12 is removed such that a plurality of undercut portions 20 and uncut portions 21 are formed in the substrate 12. In certain embodiments, the undercut portions 20 are made using an engraving process. However, it is to be understood that other methods for creating the undercut portions, including for example, the use of an electrical discharge machining (EDM) process or lasers, are useful with the present invention.

In a preferred method the desired outside diameter of the top surface 14 of the substrate 12 is precise and uniform such that, upon completion of a revolution of the substrate coated mandrel, a relatively precise pattern match is formed on the top surface 14.

In a preferred embodiment each undercut portion 20 generally defines an opening 22 having side walls 24 and a base 26. The sidewalls 24 and base 26 are defined by the uncut portions 21. It is to be understood that, according to the present invention, the geometric shape of the opening can be any desired configuration, such as circular, square, pentagonal, hexagonal and the like. For ease of illustration only, one shape is shown in the figures. In certain embodiments, the openings 22, preferably all have substantially the same geometric shape. However, it should be understood that the shapes and depths of the plurality of openings on the screen can be different. It is to be understood that various suitable processes can be used to remove the portions of the substrate material. In certain embodiments, when the first pattern is cut in a substrate using an engraving process, as is shown in FIG. 2, the sidewalls 24 generally taper at least about an angle $\alpha$ from the top surface 14. In various embodiments, the $\alpha$ angle is generally about 10° from perpendicular. For ease of illustration, the remaining figures show straight sidewalls 24.

In certain embodiments a registration band or area 28 is established near at least one end of the mandrel 10 and/or substrate 12 such that precise registration of the first pattern with the subsequent patterns can be established and the second pattern (and subsequent patterns) substantially coincides with the first pattern. It is to be understood that other methods for performing a precision indexing of the mandrel are useful with the present invention. For example, when an EDM process is used to form the first and/or subsequent patterns, the use of location pins (not shown) are especially useful.

Referring now to FIG. 3, a screen material 30 is applied onto the patterned substrate 12 to a predetermined thickness. The screen material 30 can be applied using any one of several different means including spray application, plating and the like. The screen material 30 substantially coats the patterned substrate 12 and substantially fills the openings 22 in the patterned substrate 12. In preferred embodiments, the screen material 30 is coated onto the patterned substrate 12 to a depth of about 2 to about 100 mils. In practice, it has been found that a coating of about 15 to about 25 mils works particularly well.

The screen material 30 has a top surface 32 and a bottom surface 34. In a preferred method, the outside diameter defined by the top surface 32 of the screen material 30 is precise and uniform such that, upon completion of a revolution of the coated substrate, a relatively precise pattern match is formed on the top surface 32.

Figure 6:
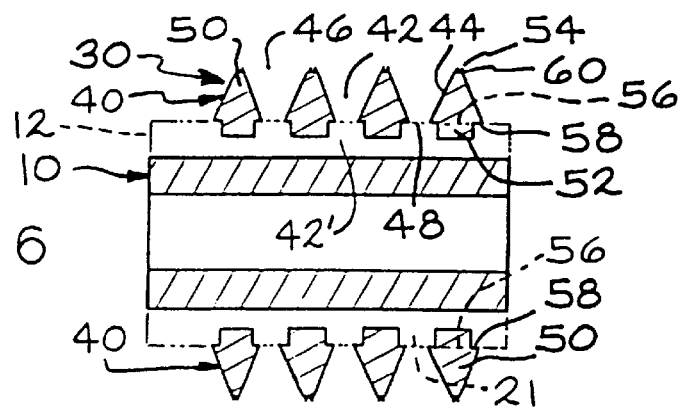
FIG. 6 is a greatly enlarged schematic cross-sectional view showing a sixth step in one method of making a screen.

Referring now to FIGS. 4 to 6, a precise predetermined amount of the screen 30 is removed such that a plurality of cut portions 40 are formed in the screen material 30. In certain embodiments, the cut portions 40 are made using an engraving process or an EDM process. In certain preferred embodiments, the EDM process is especially useful for providing precise predetermined shapes to the cut portions 40. A sufficient amount of screen is removed in the cut portions 40 such that corresponding perforations 42 are formed in the screen material 30. The perforations 42 are defined by walls 44 and have a first opening 46 in the plane of the top surface 32 of the screen material 30 and a second opening 48 (as best seen in FIG. 6) in a spaced apart relationship from the first opening 46. The second opening 48 is formed by removing a sufficient amount of the screen material 30 to a sufficient depth such that the uncut portions 21 of the substrate 12 are at least partially exposed. In a preferred embodiment, the plurality of perforations 42 are formed in a precise predetermined pattern. The pattern coincides exactly with the pattern of the undercut portions 20 on the substrate 12. In certain embodiments, the perforations 42 preferably all have substantially the same geometric shape and depth. However, it should be understood that the shapes and depths of various perforations 42 in the screen material 30 can be different from other perforations 42. It should be understood that the screen material 30 remains connected due to the presence of screen material 30 adjacent the perforations 42.

The patterned screen 30 generally defines a plurality of top portions 50, each of which are defined by the walls 44 of each perforation 42. The patterned screen 30 also defines a plurality of base portions 52. The shape of the base portions 52 is determined by the shape of the openings 22 in the substrate 12. For ease of illustration, the top portions 50 shown in the figures have a generally tapered or frustoconical shape. However, in other embodiments (not shown), the top portions 50 can have any desired shape. Each top portion 50 has a first end 54 which is defined by the top surface 32 of the screen material 30 and a second end 56, in certain embodiments, which generally has a diameter or cross-section which differs from the cross-section of the first end 54. The base portion 52 generally has a diameter or cross-section which differs from the cross-section of the second end 56. In the embodiment shown in FIG. 4, the second end 56 defines a flange 58 which extends beyond the base portion 52. It should be understood that while the embodiments shown in FIGS. 1–9 depicts base portions 52 which have smaller diameters or cross-sections than the second ends 56 of the top portions 50, in other embodiments (as seen in FIGS. 10–12 and 14), the base portions 52 can have greater diameter cross-sections, and can define more than one opening (as will be described below in reference to FIGS. 11–13).

Thus, the first pattern, which is formed on the substrate 12, ultimately becomes the bottom portion 52 of the screen 30, while the second pattern, formed on the top surface 32 of the screen 30, forms the top portion 50 of the screen 30. According to the present invention, part of the geometry of each perforation 42 is defined by the first pattern formed in the substrate and by the second pattern formed in the screen material. Thus, according to the present invention, it is possible to form a screen in which the geometry of the top portion of the perforation can greatly differ from the geometry of the bottom portion of the perforation.

In certain embodiments, the majority of the depth of the perforation can be formed by removing greater portions of the substrate material when the first pattern is being formed on the substrate. Alternatively, the second pattern formed on the screen material can be formed such that a majority of the depth of the perforation is defined by the perforation formed in the screen material.

In various preferred embodiments, the first pattern is formed in the substrate by removal of portions of the substrate using either an engraving process or an EDM process. It is also preferred that the second pattern be formed in the screen material by removal of portions of the screen material using either an engraving process or an EDM process. It is also within the contemplated scope of the present invention that more than one pattern can be formed in the substrate and/or in the screen material.

In various preferred embodiments, it is preferred to form the first pattern in the substrate using an engraving process and to form the second pattern in the screen material using an EDM process which is precise and capable of producing relatively straight edges.

In certain embodiments, it is optional but advantageous to have the second opening 48 have an effective diameter, preferably about 10% to about 35% smaller than the effective diameter of the first opening 46. It is to be understood, however, that the desired diameters of the openings 46 and 48 depend on the type of film being formed and the desired hole geometry of that film. In various embodiments, the ratio of first opening diameter to second opening diameter ranges from about 0.5 to about 1.5 and in various embodiments, it ranges from about 0.8 to about 1.2 and in various embodiments, about 1:1.

In certain embodiments, as shown in FIGS. 1–6, where an engraving process is used to remove portions of the screen material 30, a precise predetermined third pattern can be further formed on the top surface 32 of the patterned screen 30, such that a plurality of embossments 60 form a microtextured surface on the top portions 50. FIG. 5 shows the embossments 60 which have been formed on the top surface 32 of the screen material 30 as the perforations 42 are being formed in the screen material 30. In certain embodiments, it is desirable to form the embossments 60 as the engraving process forms the opening 48. That is, an engraving tool (not shown) can remove portions of the screen material 30, to first form the first opening 46 and then form the second opening 48. When the engraving process forms the opening 48, the engraving tool (not shown) abuts the first end 54 of the top portion 50 in a manner to cause a plurality of embossments 60 to be formed on the first ends 54. It is to be understood, however, that the embossing or microtexturing of the outside diameter of the screen material 30, while advantageous in certain embodiments, is not required in all embodiments of the present invention.

In a preferred embodiment, the desired screen material comprises at least one layer of a nickel material. It should be understood, however, that other metals such as copper are also useful in the present invention. In certain embodiments, the screen material can be bimetallic in structure. For example, copper and nickel are very compatible materials and readily bond to each other. In various embodiments, the screen material can have a multi-layer structure comprising, for example, a first layer of nickel which substantially fills the undercut portions 20 and a majority of portions 50 and a second layer comprising copper which forms the top portions 50 and first ends 54.

In further embodiments, it is desired to apply a thin coating of material (not shown in the figures), which is coated or flashed onto the surface of the screen to provide a smooth surface. In certain embodiments, a nickel flashing coating layer slows the wearing of the screen through use. The screen can be flashed with electroless nickel, preferably about one thousands to about two thousands mil thickness or alternatively to dip the screen in a tank to apply a sulfamate nickel flashing layer.

In other embodiments, it is preferred to use a plasma spray process to provide a microtexture on the screen, rather than the microtexturing by the engraving process. In application of a plasma spray, the surface of the screen can be bead blasted, for example, to provide slightly more surface area to improve the bonding of the plasma spray to the screen surface. In various embodiments, the plasma spray allows for the formation of screens having a better deglossing characteristic.

FIG. 6 shows the patterned screen 30 after the substrate 12 has been removed from the mandrel 10. When the uncut portions 21 of the substrate are moved, a plurality of perforations 42', which are in communication with the perforations 42, are formed in the screen 30. In certain preferred embodiments, the substrate 12 is removed by dissolving the substrate 12 in order to release the patterned screen 30 from the mandrel 10. Any suitable solvent for dissolving the substrate material can be utilized with the present invention. In certain embodiments, useful solvents include caustic and/or muriatic acids. The patterned screen 30 is then removed from the mandrel 10 and used as a screen in a film forming process.

In certain embodiments, it is optional but advantageous to have the undercut portions 20, which are defined by base portions 52, (and which become the perforations 42' upon removal of the substrate material) be about 10% to about 40%, and preferably about 12% to about 38%, of the combined depth of the perforations 42 and 42'. It is preferred that the top portion 50 be about 60% to about 90%, and preferably about 62% to about 88% of the combined depth of the perforations 42 and 42'. In certain preferred embodiments, the base portion 52 defines about 25% of the combined depth of the perforations 42 and 42', while the top portion 50 defines approximately 75% of the combined depth of the perforations 42 and 42'. In practice, it has been found that perforations 42 and 42' having a combined depth of from about 10 to about 65 mils work particularly well.

Also in practice, it has been found that perforations 42, wherein the first opening 46 ranges from about 7 to about 125 mils (⅛") in diameter and the second opening 48 ranges from about 5 to about 120 mils in diameter, works particularly well.

Figure 7:
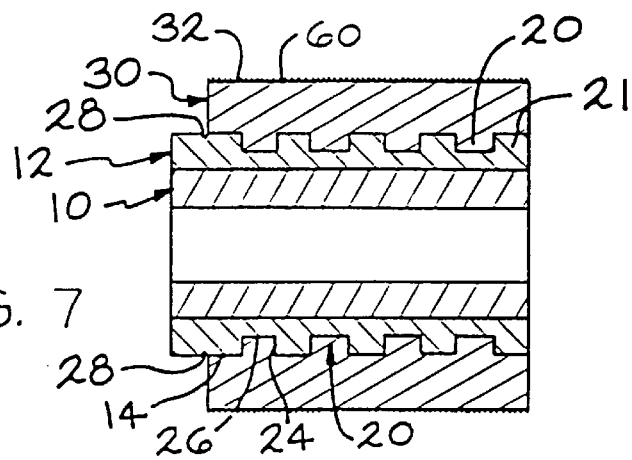
FIG. 7 is a greatly enlarged schematic cross-sectional view showing an alternative step in another method of making a screen.
Figure 8:
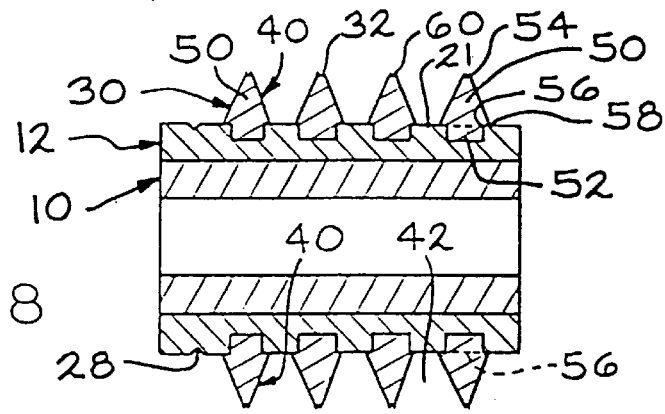
FIG. 8 is a greatly enlarged schematic cross-sectional view showing an alternative step in another method of making a screen.

In certain embodiments where an EDM process is used to form the pattern in the screen 30, it is desirable to provide the embossments 60 in the screen material 30 prior to cutting the portions 40. In these embodiments, the embossments 60 can provide a fine or detailed microtextured pattern which would be difficult to apply to the top surface 32 after the cut portions 40 have been made in the screen material 30. FIGS. 7–8 show an alternative method for producing a microtexture or embossment on the screen 30. FIG. 7 shows an alternative step wherein a plurality of embossments 60 are cut or engraved into the top surface 32 of the screen material 30. FIG. 8 shows the next alternative step, wherein the plurality of cut portions 40, each of which defines the perforations 42, are cut or engraved in the screen material 30 to form the screen 30 after the embossments 60 have been formed.

Figure 9:
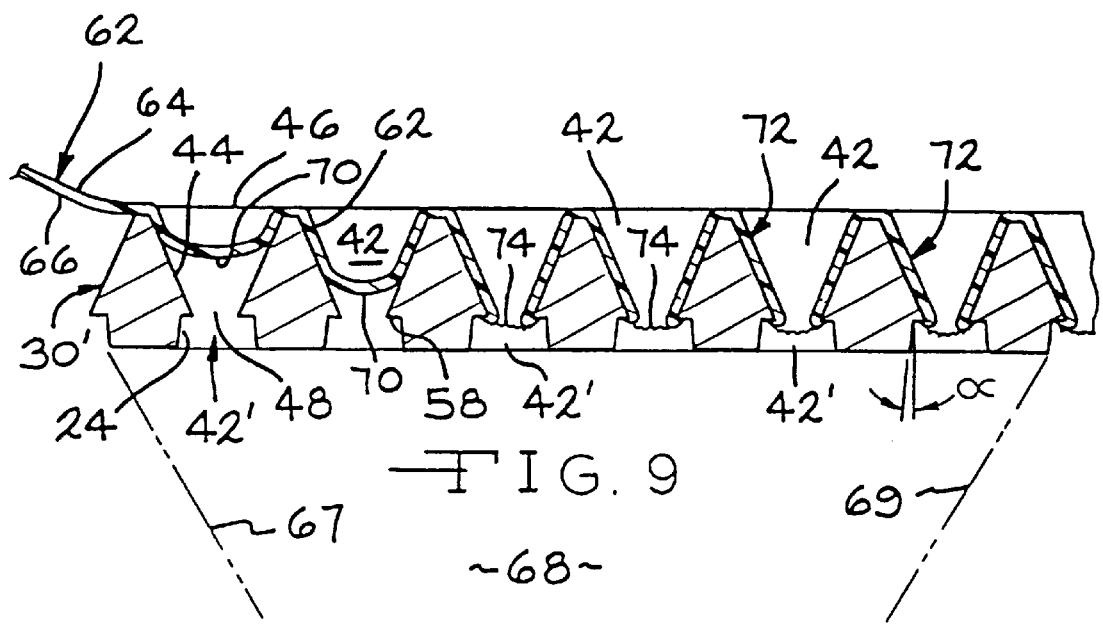
FIG. 9 is a greatly enlarged cross-sectional view of an apertured film being formed on a screen.

Referring now to FIG. 9, a portion of the screen 30 is shown. For ease of illustration, the screen 30 is shown without the embossments 60 and is also shown as being linear. However, it should be understood that, in certain embodiments, the screen 30 preferably has a circular outside diameter.

A thermoplastic film material 62 being dispensed onto the screen 30 has a top surface 64 and a bottom surface 66. A vacuum chamber 68 creates a pressure differential between the top surface 64 and the bottom surface 66 of the film 62. The pressure differential causes portions 70 of the film 62 to be pulled through the first openings 46 into the perforations 42 and through the second openings 48. The pressure differential is sufficient to pull the portions 70 of the film 62 into the perforations 42 and the perforations 42' such that the film portions 70 are pulled against the flanges 58 and held there for a sufficient time. The pressure differential is sufficient to produce three-dimensional protuberances 72 on the bottom surface 66 of the film 62.

It is to be noted that the vacuum chamber 68 generally comprises a leading edge 67 and a trailing edge 69. The protuberances 72 are generally formed in an area adjacent the leading edge 67 of the vacuum chamber 68. As the film 62 moves toward the trailing edge 69, the vacuum pressure differential cools and sets the protuberances 72 in the film 62. The width between the leading edge 67 and the trailing edge 69 can be varied such that the film spends greater or less time under the pressure differential, depending upon the desired characteristics of the film. The length of time the film is held under the vacuum pressure differential helps to "set" or embosses the protuberances 72 in the film 62. In the embodiment shown in FIG. 9, the pressure differential is regulated such that protuberances 72 which are formed rupture causing apertures 74 in the film 62. In other embodiments, the pressure differential is regulated such that the portions 70 are pulled into the perforations 42 without causing rupturing or aperturing of any protuberances which are being formed.

During a preferred film forming process, the pressure differential is sufficient to pull portions of the film material into about three-fourths of the depth of the perforations 42 and 42'. It is also to be noted that when the base portion 52 slants at an angle (α) from the perpendicular (as shown in FIGS. 2 and 9), a draft angle forms due to the vacuum pulling the portions 70 of the film 62 into the perforations 42 and 42'.

Figure 10:
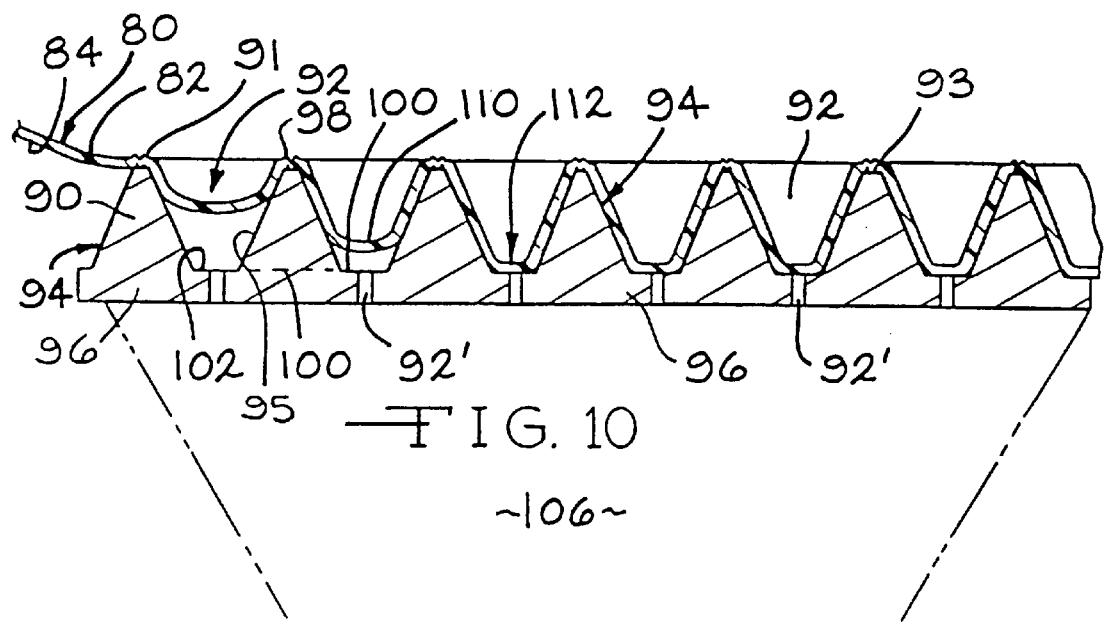
FIG. 10 is a greatly enlarged cross-sectional view of a non-apertured film being formed on a screen.

In the embodiment shown in FIG. 10, a film material 80, having a top surface 82 and a bottom surface 84, is dispensed onto a screen 90 having a top surface 91 and embossments 93. The screen 90 generally defines a plurality of perforations 92, each of which are in communication with perforations 92'.

The screen 90 generally has a plurality of top portions 94 which are defined by walls 95 of the perforations 92. The screen 90 also has a plurality of base portions 96 adjacent corresponding top portions 94. The shape of the base portions 96 is defined by the shape of openings formed in the substrate material (openings and substrate not shown in this embodiment).

For ease of illustration, the top portions 94 shown in FIG. 10 also have a generally tapered or frustro-conical shape. Each top portion 94 has a first end 98 and a second end 100 which generally has a diameter or cross-section which differs from the diameter or cross-section of the first end 98. The base portion. 96 generally has a diameter or cross-section which differs from the diameter or cross-section of the second end 100. In the embodiment shown in FIG. 10, the base portion 96 defines a flange 102 which extends beyond the second end 100. A vacuum chamber 106 creates a pressure differential between the top surface 82 and the bottom surface 84 of the film material 80. The pressure differential causes portions 110 of the film material 80 to be pulled into the perforations 92 in the screen 90. The pressure differential is sufficient to produce a plurality of three-dimensional protuberances 112 on the bottom surface 84 of the film material 80. In various embodiments, the pressure differential is regulated such that protuberances 112 are formed and extend from the bottom surface 84 of the film material 80 without any rupturing or aperturing of the protuberances 112.

The perforations 92' between the base portions 96 are defined by the amount of substrate material which has not been removed during the first cut by either an engraving or an EDM step. In certain embodiments, the width of the perforations 92' can range from about 7 mils to about 11 mils. In certain embodiments, it has been shown that the width of about 5 to about 7 mils works particularly well to pull portions 110 of the film 80 into the perforations 92 without pulling portions of the film into the perforations 92', whereby microprotuberances 112 are formed without causing rupturing or aperturing of the film 80.

Figure 11:
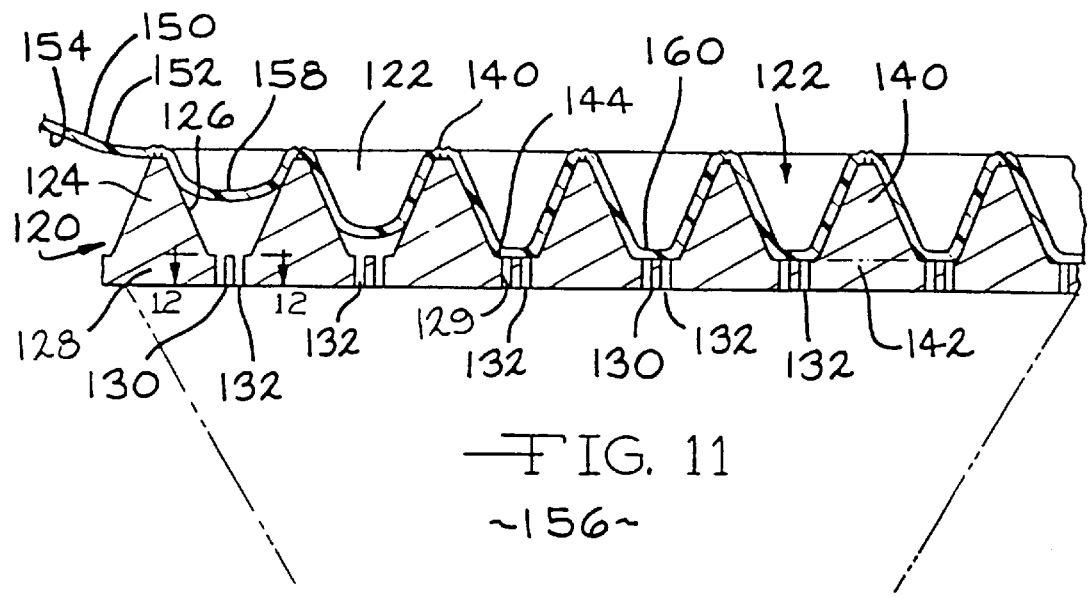
FIG. 11 is a greatly enlarged cross-sectional view of a non-apertured film being formed on a screen.

It is also within the contemplated scope of the present invention that at least two or more adjacent openings can be formed in the substrate material. FIG. 11 generally shows a screen 120 having a plurality of perforations 122. The 120 screen generally has a plurality of top portions 124, each of which is defined by walls 126 of the perforations 122. The screen 120 also has a plurality of base portions 128 having sidewalls 129. The shape of each base portion 128 is defined by the amount of substrate material removed from the substrate (not shown) when a pattern is formed on the substrate. The screen 120 also comprises a plurality of intermediate portions 130 which result from removing further portions of the substrate material during formation of the pattern on the substrate (not shown). At least one intermediate portion 130 is between adjacent base portions 128. Thus, the top portions 124, the base portions 128 and the intermediate portions 130 are formed when the screen material is applied to the patterned substrate, as explained in detail above. The intermediate portions 130 and the sidewalls 129 of the base portions 128 define a plurality of perforations 132 which are in communication with the opening 122. The perforations 132 are formed when the uncut portions of the substrate are removed, as explained in detail above.

Again, for ease of illustration, the top portions 124 shown in FIG. 11 have generally tapered or frustro-conical shape. The top portion 124 has a first end 140 and a second end 142 which generally has a diameter or cross-section which differs from the diameter or cross-section of the first end 140. The base portion 128 generally has a diameter or cross-section which differs from the diameter or cross-section of the second end 142. In the embodiment shown in FIG. 11, the base portion 128 generally has a diameter or cross-section which is greater than the diameter or cross-section of the second end 142 of the top portion 124 such that the base portion 128 defines a flange 144.

Figure 12:
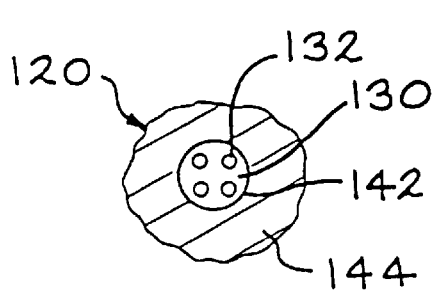
FIG. 12 is a greatly enlarged cross-sectional view taken along the line 12—12 in FIG. 11.

In certain embodiments, it is preferred that the plurality of perforations 132 can be readily formed in the screen material using, for example, an EDM process which is especially useful in forming narrow perforations in the screen material. FIG. 12 is a cross-sectional view taken along the line 12—12 in FIG. 11 and shows one embodiment where four adjacent perforations 132 are formed in the screen 120. It is to be understood that any number of perforations 132 can be formed in the screen. In various embodiments, the perforations 132 can range from about 5 to about 15 mils in width and in preferred embodiments, range from about 7 to about 11 mils in width.

Referring again to FIG. 11, a thermoplastic material 150, being dispensed onto the screen 120, has a top surface 152 and a bottom surface 154. A vacuum chamber 156 creates a pressure differential between the top surface 152 and the bottom surface 154 of the material 150. The pressure differential causes portions 158 of the material 150 to be pulled into the perforations 122 in the screen 120. The pressure differential is sufficient to produce three-dimensional protuberances 160 on the bottom surface 154 of the film 150. In the embodiment shown in FIG. 11, the pressure differential is regulated to such that the protuberances 160 are formed and extend from the bottom surface 154 of the material 150 without any rupturing of the protuberances 160.

Figure 13:
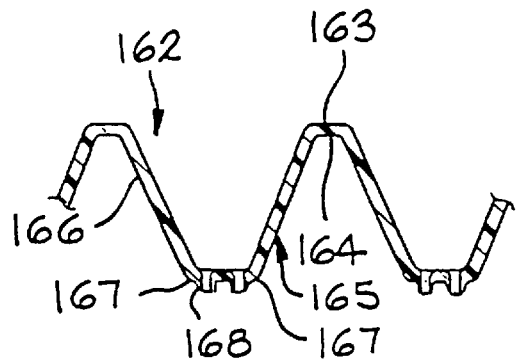
FIG. 13 is a greatly enlarged cross-sectional view of a film.

In other embodiments, however, the pressure differential is sufficient to cause the microprotuberances to rupture, thus forming an apertured film material. FIG. 13 shows a film 162 having a top surface 163 and a bottom surface 164. A plurality of protuberances 165 extend from the lower surface 164 of the film 162. Each protuberance 165 has a proximal end 166 adjacent the lower surface 164 and a distal end 167 in a spaced apart relationship from the proximal end 166. The film 162 further has a plurality of apertures 168 which extend through the distal end 167 of the protuberance 165.

Figure 14:
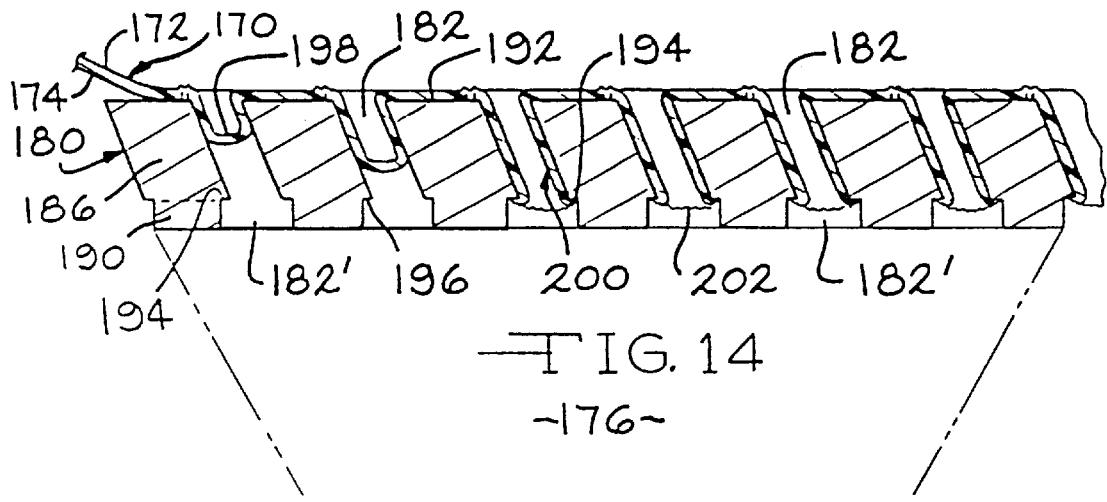
FIG. 14 is a greatly enlarged cross-sectional view of an apertured film being formed on a screen.

FIG. 14 shows an alternative embodiment wherein a thermoplastic material 170 being dispensed onto a screen 180 has a top surface 172 and a bottom surface 174. The screen 180 defines a plurality of perforations 182 and 182'. The perforations 182 shown in FIG. 14 have a slanted parallel geometric shape. The screen 180 generally has a plurality of top portions 186 and a plurality of base portions 190. The shape of the base portion 190 is defined by the shape of the pattern formed by the uncut portions in the substrate (not shown). The top portion 186 has a first end 192 and a second end 194 which has a diameter or cross-section which is generally the same width as the diameter or cross-section of the first end 192.. The base portion 190 generally has a diameter cross-section which differs from the diameter or cross-section of the second end 194. In the embodiment shown in FIG. 14, diameter or cross-section of the base 190 is less than the diameter or cross-section of the second end 194. The second end 194 and the base portion 190 generally define a flange or edge 196. It is to be understood that the shape of the flanges 196 and the perforations 182' can be varied depending on the pattern formed in the substrate material during the screen forming process.

In order to form a three-dimensional film, a vacuum chamber 176 creates a pressure differential between the top surface 172 and bottom surface 174 of the material 170. The pressure differential causes portions 198 of the material 170 to be pulled into the perforations 182 and 182' in the screen 180. The pressure differential is sufficient to produce three-dimensional protuberances 200 on the bottom surface 174 of the material 170. In the embodiment shown in FIG. 14, the pressure differential is sufficient to pull the portions 198 of the material 170 against the flange 196 and to cause the protuberances 200 to rupture forming apertures 202 in the protuberances 200. The pressure differential is held at a sufficient pressure and for a sufficient length of time to allow the apertures 202 to set in the material 170. It should be understood, however, that in other embodiments, the pressure differential can be regulated such that protuberances are formed and extend from the bottom surface of the film material without any rupturing of the protuberances.

The screens of the present invention can be used with any thermoplastic material which can be formed into flexible film or sheets. Exemplary thermoplastic materials include, cellulose e.g. cellulose acrylate, cellulose propionate, cellulose butyrate, mixed esters of cellulose, cellulose ethers, e.g. ethyl cellulose; nylon or polymeric materials, i.e. polyvinyl alcohol acetals, polyvinylchloride, polyvinylchloraceate, polystyrene, methyl methacrylate, polyethylene, polypropylene, and other polymers and blends thereof which may be formed into flexible sheets or film in the like. In certain embodiments, polyolefin are preferred and polyethylene or polyethylene blends are especially preferred. It is also understood that various shapes and sizes of apertures in these materials can be produced based on the shapes of the perforations in the screen. The screens of the present invention can be produced which have repetitive perforated areas to produce films having differing pattern, porosity, texture, appearance and mechanical properties.

The above description of the invention is given for the sake of explanation and various modifications and substitutions other than those cited, can be made without departing from the scope of the following claims.

We claim:

1. A method for the manufacture of a screen or molding element comprising:
   applying a substrate material to a base;
   removing predetermined portions of the substrate material to form a pattern in the substrate material, said pattern being defined by respective undercut and uncut surface areas of the substrate material;
   applying a screen material to the patterned substrate material;
   removing predetermined portions of the screen material to form a pattern in the screen material, the pattern in the screen material defining a plurality of perforations aligned with preselected uncut surface areas of the substrate and extending through said screen material to said preselected uncut surface areas of the substrate; and,
   removing the substrate material from the screen material and thereby forming open perforations extending through said screen material corresponding with the removed portions of the screen material.

2. The method of claim 1, wherein removing the substrate material from the screen material includes dissolving the substrate material with a suitable solvent.

3. The method of claim 1, wherein the screen material has a top surface and a bottom surface, the bottom surface being disposed adjacent the patterned substrate material prior to removing the substrate material from the screen material, the method further comprising forming a predetermined pattern in the top surface of the screen material prior to forming the perforations through the screen material.

4. The method of claim 1, wherein the screen material has a top surface and a bottom surface, the bottom surface being disposed adjacent the patterned substrate material prior to removing the substrate material from the screen material, the method further comprising forming a predetermined pattern in the top surface of the screen material after forming the first perforations through the screen material.

5. The method of claim 1, wherein the substrate material is a metal selected from the group consisting of aluminum, nickel and copper.

6. The method of claim 1, wherein the screen material comprises at least two layers, the first layer comprising nickel, and the second layer comprising copper.

7. The method of claim 1, wherein the screen material comprises at least three layers, the first layer being applied to the patterned substrate material, the second layer being applied adjacent the first layer, and the third layer being applied adjacent the second layer.

8. The method of claim 7, wherein the first, second and third layers comprise a metal selected from the group consisting of nickel and copper.

9. The method of claim 1, wherein each of the undercut surface areas of the substrate material define an opening having side walls and a base at a predetermined depth from the surface of the substrate material.

10. The method of claim 9, wherein all the openings have similar configurations.

11. The method of claim 10, wherein the depth of the openings generally ranges from about 10% to about 40% of the thickness of the screen material.

12. The method of claim 1, wherein the perforations have substantially the same geometric shape.

13. The method of claim 1, wherein a registration area is established near at least one end of the substrate material such that registration between the uncut surface areas of the pattern formed in the substrate material and the pattern formed in the screen material coincide.

14. The method of claim 1, wherein the substrate material is applied at a substantially uniform thickness.

15. The method of claim 1, wherein the screen material has a top surface and a bottom surface, the bottom surface being disposed adjacent the substrate material prior to removing the substrate material from the screen material, and wherein each perforation in the screen material has a first opening in a plane defined by the top surface of the screen material and a second opening in a spaced apart relationship from the first opening, the second opening being in communication with a respective one of the uncut surface areas of the substrate material.

16. The method of claim 15, wherein the perforations extending through the screen material are respectively defined by a plurality of top portions of the screen material and a plurality of base portions of the screen material, each top portion being disposed adjacent a corresponding base portion, each top portion having a first end which is defined by the top surface of the screen material and a second end in a spaced apart relationship from the first end, the second end being adjacent the base portion.

17. The method of claim 16, wherein the first ends of the top portions have a predetermined cross-section and the second ends of the top portions have a predetermined cross-section which differs from the cross-section of the first end.

18. The method of claim 16, wherein the first ends of the top portions have a predetermined cross-section and the second end of the top portions have a predetermined cross-section that is substantially the same as the cross-section of the first end.

19. The method of claim 17, wherein the base portion defines a cross-section which differs from the cross-section of the second end of the top portion.

20. The method of claim 18, wherein the base portion defines a cross-section which is substantially the same as the cross-section of the second end.

21. The method of claim 19, wherein the cross-section of the second end is greater than the cross-section of the base portion, whereby the second end defines a flange which extends beyond the base portion.

22. The method of claim 19, wherein the cross-section of the second end is less than the cross-section of the base portion, whereby the base portion extends beyond the second end and defines a flange.

23. The method of claim 1, wherein the predetermined pattern in the substrate material forms a plurality of undercut portions and a plurality of uncut portions in the substrate material, whereby when the screen material is applied to the patterned substrate material, the screen material substantially fills the undercut portions of the substrate material.

24. The method of claim 23, wherein, upon removal of the uncut portions of the substrate material from the screen material, the plurality of second perforations are formed in the screen material, each first perforation being connected with the adjacent second perforation.

25. A metallic screen useful for forming a three-dimensional film, comprising a plurality of top portions and a plurality of base portions, each top portion being adjacent and connected to a corresponding base portion, each top portion having a geometry which differs from each base portion, each adjacent top portion defining a first perforation, each adjacent base portion defining a second perforation, each first perforation being connected with an adjacent second perforation, wherein each first perforation has a geometry which differs from each second perforation;

each top portion having a first end which is adjacent a top surface of the screen and a second end which is in a spaced apart relationship from the first end, the first end of the top portion defining a first diameter or cross-section, the second end of the top portion defining a second diameter or cross-section which optionally, differs from the first diameter or cross-section of the first end; and, each base portion defining a third diameter or cross-section which differs from the second diameter or cross-section of the second end of the top portion whereby the second diameter or cross-section and the third diameter or cross-section define a flange.

26. The screen of claim 19, wherein the distance across the cross-section of the second end is greater than the distance across the cross-section of the base portion, whereby the second end defines a flange which extends beyond the base portion.

27. The screen of claim 19 wherein the distance across the cross-section of the second end is less than the distance across the cross-section of the base portion, whereby the base portion extends beyond the second end and defines a flange.

28. The method of claim 16, wherein the first end of each of the top portions has an embossed texture.

29. The screen of claim 28, wherein the top portion generally has a tapered or frusto-conical shape.

30. A three-dimensional non-apertured film produced using the screen of claim 25.

31. A three-dimensional apertured film produced using the screen of claim 25.

32. A method for producing a three-dimensional film utilizing the screen of claim 25 comprising:

dispensing a thermoplastic film material onto the top surface of the screen, the thermoplastic material having a top surface and a bottom surface;

providing a pressure differential between the top surface of the thermoplastic material and the bottom surface of the thermoplastic material, the pressure differential causing portions of the thermoplastic material to be pulled into a plurality of the first perforations in the screen, the pressure differential being sufficient to produce three-dimensional protuberances on the bottom surface of the thermoplastic material.

33. The method of claim 32, wherein the pressure differential is regulated such that non-apertured protuberances are formed.

34. The method of claim 32, wherein the pressure differential is regulated such that the protuberances being formed rupture causing a plurality of apertures in the thermoplastic film material.

35. A method for producing a three-dimensional film using the screen of claim 26, wherein the pressure differential is sufficient to pull the portions of the thermoplastic material into the first perforations and the second perforations and against the flanges.

36. A method for producing a three-dimensional film using the screen of claim 27 wherein the pressure differential is sufficient to pull the portions of the thermoplastic material into the first perforations and the second perforations and against the flanges.

37. A metallic screen useful for forming a three-dimensional film, comprising a plurality of top portions and a plurality of base portions, each top portion being adjacent and connected to a corresponding base portion, each top portion having a first end which is adjacent a top surface of the screen and a second end which is in a spaced apart relationship from the first end of the top portion;

the first end of the top portion defining a first diameter or cross-section, the second end of the top portion defining a second diameter or cross-section which, optionally, differs from the first diameter or cross-section of the first end of the top portion;

each base portion defining a third diameter or cross-section which differs from the second diameter or cross-section of the second end of the top portion, wherein the second diameter is less than the third diameter or cross-section of the base portion, whereby the base portion extends beyond the second end of the top portion and defines a flange;

wherein each adjacent top portion defines a first perforation and each adjacent base portion defines a second perforation, each first perforation being connected with the adjacent second perforation, each first perforation having a geometry which differs from each second perforation.

38. The screen of claim 37, wherein the first end of the top portion has an embossed texture.

39. The screen of claim 37, wherein the top portion generally has a tapered or frusto-conical shape.

40. A three-dimensional non-apertured film produced using the screen of claim 37.

41. A three-dimensional apertured film produced using the screen of claim 37.

42. A method for producing a three-dimensional film utilizing the screen of claim 37 comprising:

dispensing a thermoplastic film material onto the top surface of the screen, the thermoplastic material having a top surface and a bottom surface;

providing a pressure differential between the top surface of the thermoplastic material and the bottom surface of the thermoplastic material, the pressure differential causing portions of the thermoplastic material to be pulled into a plurality of the first perforations in the screen, the pressure differential being sufficient to produce three-dimensional protuberances on the bottom surface of the thermoplastic material.

43. The method of claim 42, wherein the pressure differential is regulated such that non-apertured protuberances are formed.

44. The method of claim 42, wherein the pressure differential is regulated such that the protuberances being formed rupture causing a plurality of apertures in the thermoplastic film material.

45. A method for producing an apertured three-dimensional film using the screen of claim 37, wherein the pressure differential is sufficient to pull the portions of the thermoplastic material into the first perforations and the second perforations and against the flanges to form a plurality of apertures in the film.

46. A method for producing a non-apertured three-dimensional film using the screen of claim 37, wherein the pressure differential is sufficient to pull the portions of the thermoplastic material into the first perforations and the second perforations and against the flanges.

* * * * *